United States Patent
Lin

(10) Patent No.: US 9,327,562 B2
(45) Date of Patent: May 3, 2016

(54) AIR MAINTENANCE TIRE ASSEMBLY

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 232 days.

(21) Appl. No.: 14/269,274

(22) Filed: May 5, 2014

(65) Prior Publication Data

US 2015/0314658 A1    Nov. 5, 2015

(51) Int. Cl.
*B60C 23/12* (2006.01)

(52) U.S. Cl.
CPC ...................... *B60C 23/12* (2013.01)

(58) Field of Classification Search
CPC ................................ B60C 23/10; B60C 23/12
See application file for complete search history.

(56) References Cited

U.S. PATENT DOCUMENTS

| | | | |
|---|---|---|---|
| 2,541,860 A * | 2/1951 | Cawley | ................... B60B 15/26 152/420 |
| 3,931,843 A | 1/1976 | Edwards et al. | |
| 3,967,670 A | 7/1976 | Brickwood | |
| 4,149,579 A | 4/1979 | Senger | |
| 4,349,064 A | 9/1982 | Booth | |
| 4,570,691 A | 2/1986 | Martus | |
| 5,180,455 A | 1/1993 | Cheng | |
| 5,201,968 A | 4/1993 | Renier | |
| 5,355,924 A | 10/1994 | Olney | |
| 5,556,489 A | 9/1996 | Curlett et al. | |
| 5,558,730 A | 9/1996 | Onley et al. | |
| 6,474,383 B1 | 11/2002 | Howald et al. | |
| 6,725,895 B1 | 4/2004 | Tsipov | |
| 6,744,356 B2 | 6/2004 | Hamilton et al. | |
| 6,880,598 B2 | 4/2005 | Haunhorst et al. | |
| 7,117,910 B2 | 10/2006 | Akahori | |
| 7,237,590 B2 | 7/2007 | Loewe | |
| 7,322,392 B2 | 1/2008 | Hawes | |
| 7,357,164 B2 | 4/2008 | Loewe | |
| 7,748,422 B2 | 7/2010 | Bol | |
| 7,784,513 B2 | 8/2010 | Loewe | |
| 7,891,393 B1 | 2/2011 | Czarno | |
| 7,911,332 B2 | 3/2011 | Caretta et al. | |
| 7,926,521 B2 | 4/2011 | Izumoto et al. | |
| 8,327,897 B2 | 12/2012 | Firestone | |
| 8,474,500 B2 | 7/2013 | Caretta et al. | |
| 8,807,182 B2 * | 8/2014 | Kelly | ...................... B60C 23/12 152/419 |
| 2005/0274442 A1 * | 12/2005 | Huang | ................ B60C 23/0408 152/415 |
| 2010/0078109 A1 | 4/2010 | Wilson et al. | |

(Continued)

FOREIGN PATENT DOCUMENTS

WO    WO0128787 A1    4/2001

OTHER PUBLICATIONS

European Search Report for Application Serial No. 15166286 dated Oct. 1, 2015.

*Primary Examiner* — Kip T Kotter
(74) *Attorney, Agent, or Firm* — Robert N. Lipcsik

(57) ABSTRACT

A pumping mechanism is used with a pneumatic tire mounted on a wheel rim to keep the pneumatic tire from becoming underinflated. The pumping mechanism includes a plurality of pumps forming a linear belt and subsequently being attached circumferentially to the wheel rim, a plurality of pump holders interconnecting the plurality of pumps in a linear configuration, and a control valve for controlling inlet air into a tire cavity of the pneumatic tire.

13 Claims, 3 Drawing Sheets

(56) References Cited

U.S. PATENT DOCUMENTS

| | | |
|---|---|---|
| 2010/0282388 A1 | 11/2010 | Kelly |
| 2013/0032263 A1 | 2/2013 | Bormann |
| 2014/0102610 A1* | 4/2014 | Lin ......................... B60C 23/12 152/450 |
| 2014/0174620 A1* | 6/2014 | Hinque ................... B60C 23/12 152/450 |

* cited by examiner

AIR MAINTENANCE TIRE ASSEMBLY

FIELD OF THE INVENTION

The present invention relates to a system and method for maintaining appropriate air pressure within a pneumatic tire. More specifically, the present invention relates to a rim mounted system for directing air into a tire cavity of a pneumatic tire.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires are often continually underinflated. Accordingly, drivers must repeatedly act to maintain tire pressures or fuel economy, tire life, and/or vehicle braking and handling performance will be reduced. Tire Pressure Monitoring Systems (TPMS) have been proposed to warn drivers when tire pressure is significantly low. Such systems, however, remain dependent upon a driver taking remedial action, when warned, to re-inflate a tire to the recommended pressure. It is desirable, therefore, to incorporate an air maintenance feature within a pneumatic tire that will maintain recommended air pressure without requiring bothersome driver intervention.

SUMMARY OF THE INVENTION

A pumping mechanism in accordance with the present invention is used with a pneumatic tire mounted on a wheel rim to keep the pneumatic tire from becoming underinflated. The pumping mechanism includes a plurality of pumps forming a linear belt and subsequently being attached circumferentially to the wheel rim, a plurality of pump holders interconnecting the plurality of pumps in a linear configuration, and a control valve for controlling inlet air into a tire cavity of the pneumatic tire.

According to another aspect of the pumping mechanism, the pumping mechanism provides a low profile and effective multi-chamber pump system mounted inside the wheel rim with no significant modification to the wheel rim and no modification to pneumatic tire.

According to still another aspect of the pumping mechanism, the pumping mechanism utilizes gravitational force changes during rotation of the pneumatic tire.

According to yet another aspect of the pumping mechanism, each pump includes a piston body moving against a pair of diaphragms.

According to still another aspect of the pumping mechanism, the piston body of each pump travel in a first direction and an opposite second direction per each revolution of the pneumatic tire.

According to yet another aspect of the pumping mechanism, load on the pneumatic tire does not affect frequency of pumping action of the pumping mechanism.

According to still another aspect of the pumping mechanism, the plurality of pumps includes 4 to 10 pumps and 4 to 10 pump holders configured circumferentially on a belt forming a loop and fitting circumferentially within a middle groove of the wheel rim.

According to yet another aspect of the pumping mechanism, the control valve is shaped similarly to the pumps such that the control valve is placed in a space between the beginning and the end of the belt.

According to still another aspect of the pumping mechanism, the pump holders have adjustable lengths that multiple sizes of wheel rim.

According to yet another aspect of the pumping mechanism, the pumping mechanism further includes a filter unit connected in series with the pumps and pump holders.

A pneumatic tire in accordance with the present invention is mounted to a wheel rim to keep the pneumatic tire from becoming underinflated. The pneumatic tire includes a plurality of pumps forming a linear belt and subsequently being attached in series to the wheel rim, a plurality of pump holders interconnecting the plurality of pumps in a linear configuration, and a control valve for controlling inlet air into a tire cavity of the pneumatic tire. The pumps function when mounted in a first circumferential direction on the wheel rim or a second opposite circumferential direction on the wheel rim.

According to another aspect of the pneumatic tire, a plurality of check valves maintain air flow in the pumps in a single direction.

According to still another aspect of the pneumatic tire, a check valve is adjacent each side of the control valve.

According to yet another aspect of the pneumatic tire, the control valve is disposed at an air let to the pumps.

According to still another aspect of the pneumatic tire, the control valve is disposed at an air outlet of the pumps into a tire cavity of the pneumatic tire.

According to yet another aspect of the pneumatic tire, the control valve is disposed in a bypass of the pumps.

According to still another aspect of the pneumatic tire, load on the pneumatic tire does not affect frequency of pumping action of the pumps.

According to yet another aspect of the pneumatic tire, the plurality of pumps includes 4 to 10 pumps and 4 to 10 pump holders configured circumferentially on a belt forming a loop and fitting circumferentially within a middle groove of the wheel rim.

According to still another aspect of the pneumatic tire, the control valve is shaped similarly to the pumps such that the control valve is placed in a space between the beginning and the end of the belt.

According to yet another aspect of the pneumatic tire, the pump holders have adjustable lengths that multiple sizes of wheel rim.

DETAILED DESCRIPTION OF DRAWINGS

The following drawings are illustrative of examples of the present invention.

DETAILED DESCRIPTION OF EXAMPLES OF THE PRESENT INVENTION

Figure 1:
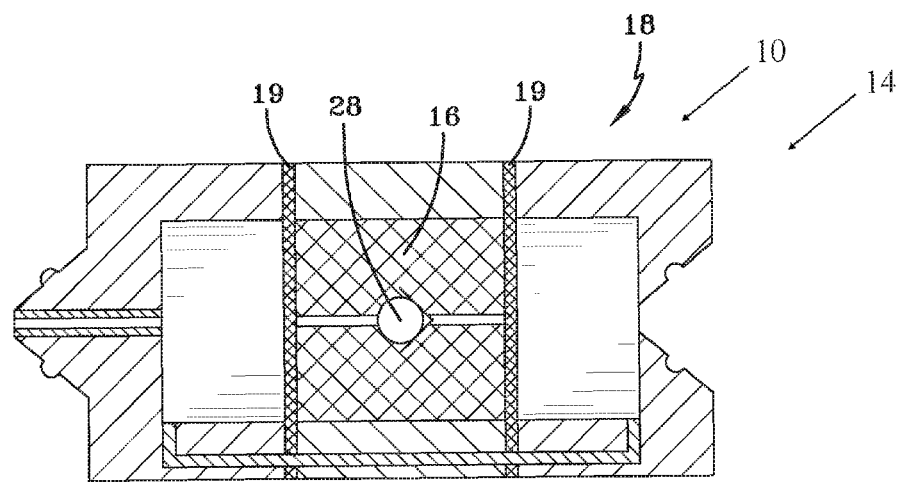
FIG. 1 is a schematic representation of part of a system in accordance with the present invention.
Figure 2:
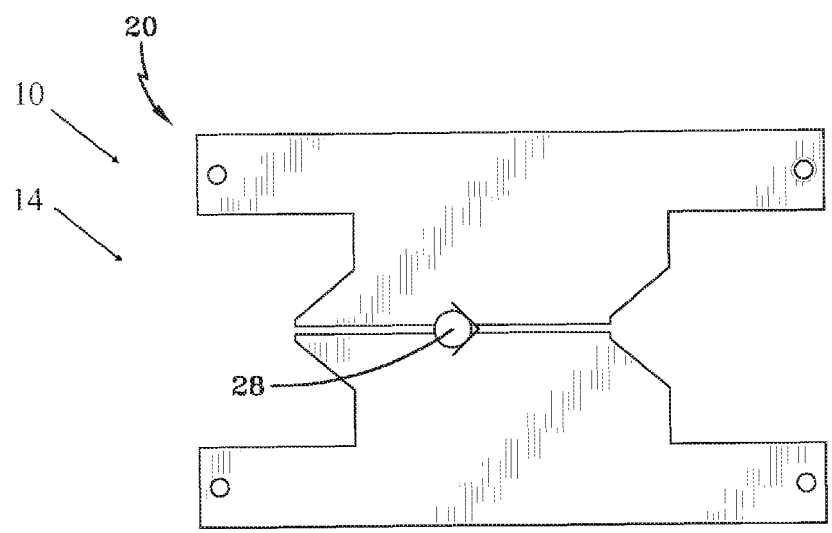
FIG. 2 is a schematic representation of another part of the system of FIG. 1.

As shown in FIGS. 1 through 6, an air maintenance tire 10 in accordance with the present invention may provide a low profile and effective multi-chamber pump system that may easily mount inside of a wheel rim with no significant modification to the wheel rim (minor modification may be required for air inlet having two stems). Further, the air maintenance tire 10 requires no significant changes to tire/wheel assembly or tire/wheel performance.

The air maintenance tire 10 may include a pumping mechanism, pump driving mechanism, or pump 14, utilizing gravitational force changes during rotation of the air maintenance tire. The pump driving mechanism 14 may include use of a mass of a piston body 16 moving against a pair of diaphragms 19 or an external mass (not shown) driving the piston body using a cam/gear system. If the mass of the piston body 16 is used, the pump driving mode may be based on force control. If a cam/gear system and external mass are used, gravitational force may drive gear rotation and convert this rotation to controllable displacement, as described in U.S. application Ser. No. 14/091,885, Air Maintenance Tire Assembly, herein incorporated by reference.

As the tire/wheel rotates, the piston body 16 may travel in a forward direction and an opposite backward direction per each revolution thereby producing a high pumping frequency. Thus, higher vehicle speed may provide higher pumping frequency. The parameters of the pumping action depend upon the mass and angular velocity of the tire/wheel assembly. Tire load or other external conditions may not effect pumping action.

Due to an amplification effect, the compression of the pump driving mechanism 14 may be defined as:

$$R=(r)^{2n}$$

where
R: system compression ratio
r: single chamber compression ratio
n: number of pump in the system Thus, a high compression ratio for each pump 18 is not necessary to achieve a high compression ratio (e.g., low force and/or deformation may produce high compression).

The pump driving mechanism 14 may include 4 to 10 pumps 18 and pump holders 20 may be configured linearly on a belt forming a loop and fitting circumferentially in a middle groove of the wheel rim (radially innermost part of the wheel rim). A control valve 22 may be shaped similarly to the pumps 18 and may be placed in a space between the beginning and the end of the belt. Pump holders 20 may have adjustable lengths that fit any size of wheel rim.

Figure 3:
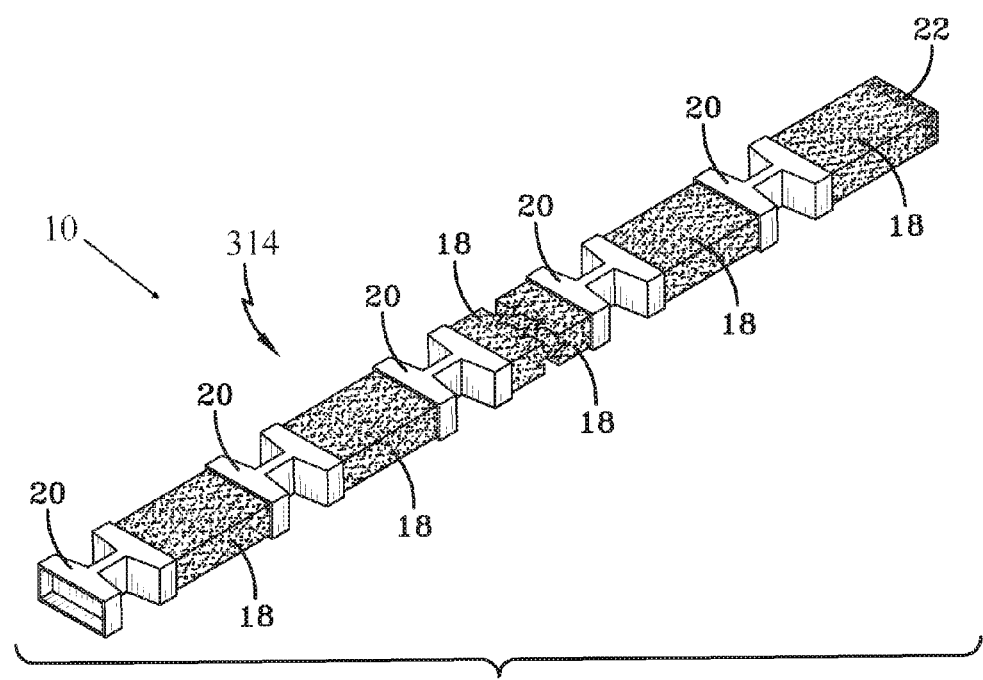
FIG. 3 is a schematic representation of another example system in accordance with the present invention.

A passage connection from a first valve stem to the control valve inlet port may be connected after the belt is secured to wheel rim (FIG. 3). The control valve 22 may include a filter unit 30. The pump driving mechanism 314 may be bi-directional and mounted in either direction. The control valve 22 may include an adjustment for varying a set pressure for the tire cavity. The pump driving mechanism 314 thus may have a low profile around the wheel rim 12 that in no way interferes with tire mount/dismount and provides clearance in the tire cavity for impacts incurred (cleat or pothole) during driving of the vehicle. Further, a 360° design of the pump driving mechanism 314 may be a balanced construction in no way degrading the balance of the tire/wheel assembly.

Figure 4:
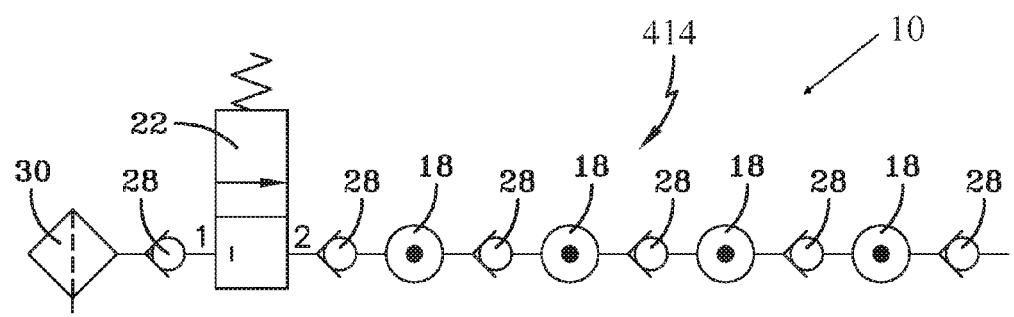
FIG. 4 is a schematic representation of part of still another example system in accordance with the present invention.

FIG. 4 shows of an example configuration 414 having four pumps 18, six check valves 28, a control valve 22, and a filter 30. This configuration 414 may scale to n pumps 18 with the control valve 22 controlling air inlet into the configuration from outside of the tire 10. The check valve 28 to the left of the control valve 22 in FIG. 5 may be optional.

Figure 5:
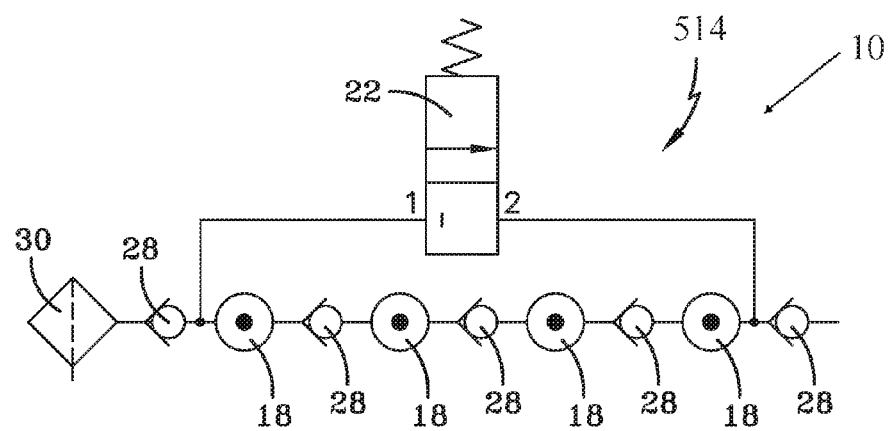
FIG. 5 is a schematic representation of another part of the example system of FIG. 4.

FIG. 5 shows of another example configuration 514 having four pumps 18, five check valves 28, a control valve 22, and a filter 30. This configuration 514 may scale to n pumps 18 with the control valve 22 controlling air outlet from the configuration to the tire cavity. The control valve 22 may be placed in a bypass of the pumps 18.

Figure 6:
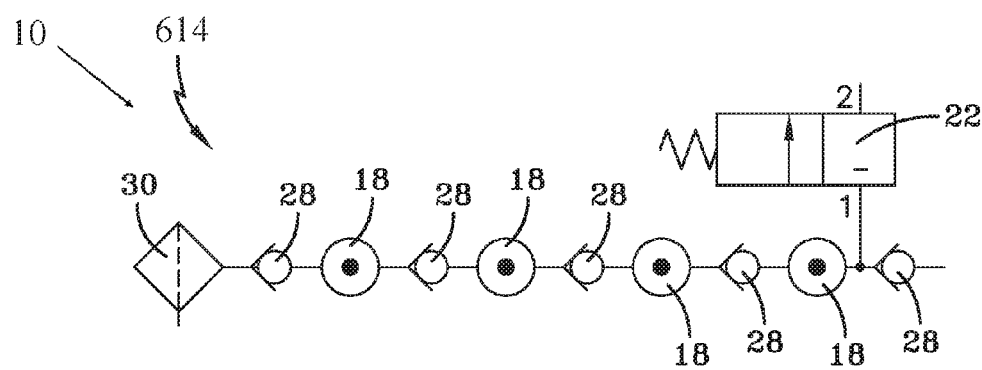
FIG. 6 is a schematic representation of still another part of the example system of FIG. 4.

FIG. 6 shows of still another example configuration 614 having four pumps 18, five six check valves 28, a control valve 22, and a filter 30. This configuration 614 may scale to n pumps 18 with the control valve 22 controlling air outlet from the configuration to the tire cavity. The control valve 22 may be placed in series with the n pumps 18.

While certain representative examples and details have been shown for the purpose of illustrating the present invention, it will be apparent to those skilled in this art that various changes and modifications may be made therein without departing from the spirit or scope of the present invention.

What is claimed:

1. A pumping mechanism for use with a pneumatic tire mounted on a wheel rim to keep the pneumatic tire from becoming underinflated, the pumping mechanism comprising:
   a plurality of pumps forming a linear belt and subsequently being attached circumferentially to the wheel rim;
   a plurality of pump holders interconnecting the plurality of pumps in a linear configuration; and
   a control valve for controlling inlet air into a tire cavity of the pneumatic tire.

2. The pumping mechanism as set forth in claim 1 wherein the pumping mechanism provides a low profile and effective multi-chamber pump system mounted inside the wheel rim with no modification to the wheel rim and no modification to pneumatic tire.

3. The pumping mechanism as set forth in claim 1 wherein the pumping mechanism utilizes gravitational force changes during rotation of the pneumatic tire.

4. The pumping mechanism as set forth in claim 1 wherein each pump includes a piston body moving against a pair of diaphragms.

5. The pumping mechanism as set forth in claim 4 wherein the piston body of each pump travel in a first direction and an opposite second direction per each revolution of the pneumatic tire.

6. The pumping mechanism as set forth in claim 1 wherein load on the pneumatic tire does not affect frequency of pumping action of the pumping mechanism.

7. The pumping mechanism as set forth in claim 1 further including a filter unit.

8. A pneumatic tire mounted to a wheel rim to keep the pneumatic tire from becoming underinflated, the pneumatic tire comprising:
   a plurality of pumps forming a linear belt and subsequently being attached in series to the wheel rim, the pumps functioning when mounted in a first circumferential direction on the wheel rim or a second opposite circumferential direction of the wheel rim;
   a plurality of pump holders interconnecting the plurality of pumps in a linear configuration; and
   a control valve for controlling inlet air into a tire cavity of the pneumatic tire.

9. The pneumatic tire as set forth in claim 8 further including a plurality of check valves for maintaining air flow in the pumps in a single direction.

10. The pneumatic tire as set forth in claim 8 further including a check valve adjacent each side of the control valve.

11. The pneumatic tire as set forth in claim 8 wherein the control valve is disposed at an air outlet of the pumps into a tire cavity of the pneumatic tire.

12. The pneumatic tire as set forth in claim 8 wherein the control valve is disposed in a bypass of the pumps.

13. The pneumatic tire as set forth in claim 8 wherein load on the pneumatic tire does not affect frequency of pumping action of the pumps.

* * * * *